US009667353B2

(12) United States Patent
Åstrand et al.

(10) Patent No.: US 9,667,353 B2
(45) Date of Patent: May 30, 2017

(54) METHODS OF PROVIDING BODY AREA NETWORK COMMUNICATIONS WHEN A USER TOUCHES A BUTTON OF A WIRELESS ELECTRONIC DEVICE, AND RELATED WIRELESS ELECTRONIC DEVICES AND WEARABLE WIRELESS ELECTRONIC DEVICES

(71) Applicant: Sony Corporation, Tokyo (JP)

(72) Inventors: Per Åstrand, Lund (SE); Thomas Bolin, Lund (SE); Stjepan Begic, Bunkeflostrand (SE); Henrik Bengtsson, Lund (SE); Alexandar Rodzevski, Malmö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 124 days.

(21) Appl. No.: 14/328,832

(22) Filed: Jul. 11, 2014

(65) Prior Publication Data

US 2016/0013872 A1 Jan. 14, 2016

(51) Int. Cl.
*H04W 4/00* (2009.01)
*H04B 13/00* (2006.01)
*H04L 29/06* (2006.01)
*G06F 21/35* (2013.01)
*H04W 12/06* (2009.01)

(52) U.S. Cl.
CPC ........... *H04B 13/005* (2013.01); *G06F 21/35* (2013.01); *H04L 63/0853* (2013.01); *H04W 4/008* (2013.01); *H04W 12/06* (2013.01)

(58) Field of Classification Search
CPC .................................................. H04B 13/005
USPC ..................... 455/41.1, 41.2, 41.3
See application file for complete search history.

(56) References Cited

U.S. PATENT DOCUMENTS

| 5,796,827 A | * | 8/1998 | Coppersmith ....... A61B 5/0024 380/265 |
| 6,580,356 B1 | | 6/2003 | Alt et al. |
| 7,202,773 B1 | | 4/2007 | Oba et al. |

(Continued)

FOREIGN PATENT DOCUMENTS

| EP | 2018038 A2 | 1/2009 |
| EP | 2 378 748 A1 | 10/2011 |

(Continued)

OTHER PUBLICATIONS

"The Nymi White Paper", Bionym, Nov. 19, 2013, 28 pages.

(Continued)

*Primary Examiner* — Wen Huang
(74) *Attorney, Agent, or Firm* — Myers Bigel, P.A.

(57) ABSTRACT

Methods of providing communications between a wearable first wireless electronic device and a second wireless electronic device are provided. The methods include establishing a Body Area Network (BAN) link, through a human body of a user that is wearing the wearable first wireless electronic device, between the wearable first wireless electronic device and the second wireless electronic device, when the user touches a conductive button on the second wireless electronic device. Related wireless electronic devices and wearable wireless electronic devices are also provided.

20 Claims, 8 Drawing Sheets

(56) References Cited

U.S. PATENT DOCUMENTS

| | | | |
|---|---|---|---|
| 2002/0030585 A1* | 3/2002 | Doi | H04B 13/005 340/5.64 |
| 2002/0128030 A1* | 9/2002 | Eiden | H04B 13/005 455/519 |
| 2002/0190689 A1* | 12/2002 | Nakamura | G04C 10/00 320/102 |
| 2005/0008148 A1 | 1/2005 | Jacobson | |
| 2005/0243061 A1 | 11/2005 | Liberty et al. | |
| 2006/0258408 A1* | 11/2006 | Tuomela | H04B 13/005 455/569.1 |
| 2007/0145119 A1 | 6/2007 | Rhelimi | |
| 2007/0282783 A1 | 12/2007 | Singh | |
| 2008/0208493 A1* | 8/2008 | Nakada | H04B 13/005 702/64 |
| 2009/0094681 A1 | 4/2009 | Sadler et al. | |
| 2010/0246643 A1* | 9/2010 | Lim | H04B 13/005 375/147 |
| 2010/0277435 A1* | 11/2010 | Han | G06F 3/0416 345/174 |
| 2011/0205156 A1 | 8/2011 | Gomez et al. | |
| 2012/0026129 A1 | 2/2012 | Kawakami | |
| 2012/0071149 A1* | 3/2012 | Bandyopadhyay | G06F 1/1643 455/418 |
| 2012/0249409 A1 | 10/2012 | Toney et al. | |
| 2012/0324368 A1 | 12/2012 | Putz et al. | |
| 2013/0017789 A1 | 1/2013 | Chi et al. | |
| 2013/0165048 A1* | 6/2013 | Karlsson | H04B 13/005 455/41.3 |
| 2013/0174049 A1 | 7/2013 | Townsend et al. | |
| 2014/0009262 A1* | 1/2014 | Robertson | H04B 13/005 340/5.52 |
| 2014/0085050 A1 | 3/2014 | Luna | |
| 2014/0325614 A1* | 10/2014 | Rhelimi | H04B 13/005 726/4 |
| 2015/0301644 A1* | 10/2015 | Walley | H04B 13/005 345/174 |
| 2016/0044445 A1* | 2/2016 | Hu | H04B 5/00 455/41.3 |

FOREIGN PATENT DOCUMENTS

| | | |
|---|---|---|
| EP | 2 600 319 A1 | 6/2013 |
| JP | 2008073462 A | 4/2008 |
| JP | 2009049951 A | 3/2009 |
| WO | WO 2011021531 A1 | 2/2011 |

OTHER PUBLICATIONS

Notification of Transmittal of the International Search Report and the Written Opinion of the International Searching Authority, or the Declaration, in corresponding PCT Application No. PCT/JP2015/000089 mailed Mar. 16, 2015 (10 pages).

Austria Microsystems, Product Information Datasheet—"AS3900", Date Unknown, 1 page.

\* cited by examiner

METHODS OF PROVIDING BODY AREA NETWORK COMMUNICATIONS WHEN A USER TOUCHES A BUTTON OF A WIRELESS ELECTRONIC DEVICE, AND RELATED WIRELESS ELECTRONIC DEVICES AND WEARABLE WIRELESS ELECTRONIC DEVICES

FIELD

The present inventive concepts generally relate to the field of wireless communications.

BACKGROUND

Over-the-air wireless communications between wireless electronic devices can be impaired by a human body. For example, when some wireless electronic devices are coupled to a hand or a face of a person, such coupling may harm communications by impairing transmission and/or reception quality. Accordingly, some wireless electronic devices are designed to reduce or compensate for the effects of a human body on over-the-air wireless communications. Moreover, providing wireless communications through the air may consume significant amounts of power of wireless electronic devices and may have security vulnerabilities.

SUMMARY

Various embodiments of the present inventive concepts include a method of providing communications between a wearable first wireless electronic device and a second wireless electronic device. The method may include establishing a Body Area Network (BAN) link, through a human body of a user that is wearing the wearable first wireless electronic device, between the wearable first wireless electronic device and the second wireless electronic device, when the user touches a conductive button on the second wireless electronic device. Moreover, in some embodiments, the method may include automatically transmitting authentication information that unlocks a display screen of the second wireless electronic device, via the BAN link, from the wearable first wireless electronic device to the second wireless electronic device, when the user touches the conductive button on the second wireless electronic device.

In various embodiments, the method may include receiving, at the wearable first wireless electronic device, the authentication information from the second wireless electronic device via a short-range radio link, before establishing the BAN link. In some embodiments, receiving the authentication information from the second wireless electronic device via the short-range radio link may include receiving the authentication information from the second wireless electronic device via a Bluetooth link between the wearable first wireless electronic device and the second wireless electronic device before establishing the BAN link.

According to various embodiments, the method may include receiving, at the wearable first wireless electronic device, a signal from the second wireless electronic device via the BAN link. Moreover, the method may include initializing a BAN circuit of the wearable first wireless electronic device in response to receiving the signal via the BAN link.

In various embodiments, the method may include receiving, at the wearable first wireless electronic device, authentication information that is configured to unlock a display screen of the second wireless electronic device, from the second wireless electronic device. The method may include detecting removal of the wearable first wireless electronic device from the human body of the user. Moreover, the method may include automatically deleting the authentication information from the wearable first wireless electronic device in response to detecting the removal of the wearable first wireless electronic device from the human body of the user.

According to various embodiments, operations of automatically transmitting the authentication information may include automatically transmitting the authentication information via the BAN link through a transmission medium provided by the human body of the user wearing the wearable first wireless electronic device to the second wireless electronic device, using a frequency between about 10.0 Megahertz (MHz) and about 40.0 MHz. Moreover, in some embodiments, the second wireless electronic device is a mobile telephone, the wearable first wireless electronic device is worn on an arm of the user, the mobile telephone is held by a hand of the user, and automatically transmitting the authentication information includes automatically transmitting the authentication information through the arm on which the wearable first wireless electronic device is worn by the user to the mobile telephone that is held by the hand of the user.

A wearable first wireless electronic device, according to various embodiments, may include a Body Area Network (BAN) transceiver circuit that is configured to provide communications with a second wireless electronic device via a BAN link through a human body of a user that is wearing the wearable first wireless electronic device, when the user touches a conductive button on the second wireless electronic device. In some embodiments, the BAN transceiver circuit may be configured to automatically transmit authentication information that unlocks a display screen of the second wireless electronic device, via the BAN link, from the wearable first wireless electronic device to the second wireless electronic device, when the user touches the conductive button on the second wireless electronic device.

In various embodiments, the wearable first wireless electronic device may include a short-range radio transceiver circuit that is configured to receive the authentication information from the second wireless electronic device before the wearable first wireless electronic device establishes the BAN link with the second wireless electronic device. Moreover, in some embodiments, the short-range radio transceiver circuit may include a Bluetooth transceiver circuit that is configured to receive the authentication information from the second wireless electronic device via a Bluetooth link between the wearable first wireless electronic device and the second wireless electronic device before the wearable first wireless electronic device establishes the BAN link.

According to various embodiments, the BAN transceiver circuit may be configured to receive a signal from the second wireless electronic device via the BAN link. Moreover, the wearable first wireless electronic device may include a processor, and the processor may be configured to wake the BAN transceiver circuit from a sleep mode in response to receiving the signal via the BAN link.

In various embodiments, the wearable first wireless electronic device may include a short-range radio transceiver circuit that is configured to receive authentication information that is configured to unlock a display screen of the second wireless electronic device, from the second wireless electronic device, before the wearable first wireless electronic device establishes the BAN link with the second wireless electronic device. Moreover, in some embodiments the wearable first electronic device may include a processor, a memory, and a sensor that is configured to detect removal of the wearable first wireless electronic device from the human body of the user. The processor may be configured to automatically delete the authentication information from the memory in response to detection by the sensor of the removal of the wearable first wireless electronic device from the human body of the user.

According to various embodiments, the wearable first wireless electronic device may include first and second electrodes that are spaced apart from each other. Moreover, the BAN transceiver circuit may be configured to provide the communications via the BAN link through the first and second electrodes, and the first and second electrodes may be configured to provide the communications through the human body of the user by imposing an electric field on the human body of the user.

A first wireless electronic device, according to various embodiments herein, may include a Body Area Network (BAN) transceiver circuit that is configured to provide communications with a wearable second wireless electronic device via a BAN link through a human body of a user that is wearing the wearable second wireless electronic device, when the user touches a conductive button on the first wireless electronic device. Moreover, in some embodiments, the first wireless electronic device may include a display screen and a processor that is configured to unlock the display screen using authentication information. The BAN transceiver circuit may be configured to receive the authentication information from the wearable second wireless electronic device, via the BAN link, when the user touches the conductive button on the first wireless electronic device.

In various embodiments, the first wireless electronic device may include a Bluetooth transceiver that is configured to transmit the authentication information to the wearable second wireless electronic device via a Bluetooth link before the first wireless electronic device establishes the BAN link. Additionally or alternatively, the first wireless electronic device may include an insulating material that defines an insulating perimeter around the conductive button, and may include an electrical connection between the conductive button and the BAN transceiver circuit.

According to various embodiments, the first wireless electronic device may include first and second electrodes that are spaced apart from each other. Moreover, the conductive button on the first wireless electronic device may be one of the first and second electrodes, the BAN transceiver circuit may be configured to provide the communications via the BAN link through the first and second electrodes, and the first and second electrodes may be configured to provide the communications through the human body of the user by imposing an electric field on the human body of the user.

Other devices and/or systems according to embodiments of the inventive concepts will be or become apparent to one with skill in the art upon review of the following drawings and detailed description. It is intended that all such additional devices and/or systems be included within this description, be within the scope of the present inventive concepts, and be protected by the accompanying claims. Moreover, it is intended that all embodiments disclosed herein can be implemented separately or combined in any way and/or combination.

DETAILED DESCRIPTION OF EMBODIMENTS

Figure 1:
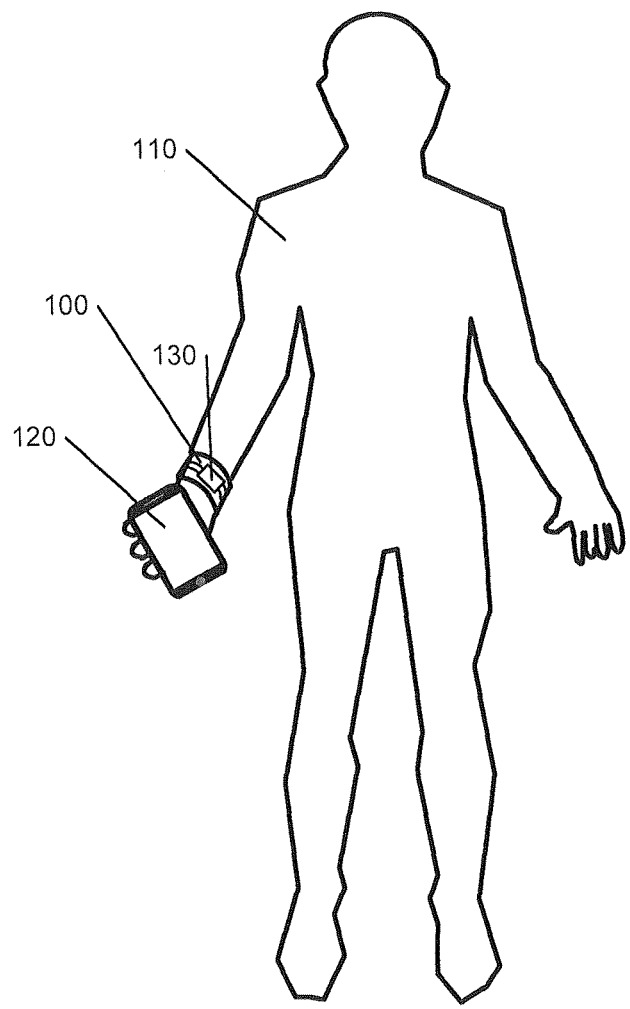
FIG. 1 is a schematic illustration of a wearable wireless electronic device and another wireless electronic device that can communicate with each other through the body of a human user, according to various embodiments of the present inventive concepts.

The present inventive concepts now will be described more fully with reference to the accompanying drawings, in which embodiments of the inventive concepts are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly-formal sense unless expressly so defined herein. Moreover, the term "about," as described herein, means that the recited number or value can vary by up to +/−25%.

Mobile wireless electronic devices such as mobile phones and tablets may provide enhanced security by requiring unlocking of a display screen thereof after the display screen goes blank (i.e., after the display screen is turned off). For example, unlocking the display screen may require manual user entry of an alphanumeric code/key or use of a biometric sensor (e.g., a fingerprint sensor) by the user. Various embodiments of the present inventive concepts, however, allow a user of a wireless electronic device to wear a wearable wireless electronic device that can automatically transmit a code/key to the other wireless electronic device via a Body Area Network (BAN) through the body of the user when the user touches a button on the other wireless electronic device.

Referring now to FIG. 1, a schematic diagram illustrates a wearable wireless electronic device 100 and another wireless electronic device 120 that can communicate with each other through the body of a human user 110, according to various embodiments of the present inventive concepts. Communications through the body of the user 110 may be referred to as Body Area Network (BAN) communications. The user 110 is a user of both the wearable wireless electronic device 100 and the other wireless electronic device 120. The wearable wireless electronic device 100 may be a wristband, a watch (e.g., a smart watch), or an armband that includes a BAN transceiver 130 that is configured to provide BAN communications through the body of the user 110 to the other wireless electronic device 120. In particular, the BAN transceiver 130 is configured to provide BAN communications through the body of the user 110 to the other wireless electronic device 120 when the wearable wireless electronic device 100 is worn by the user 110 and the user 110 is touching an electrode (e.g., the electrode/conductive button 221 that is described herein with respect to FIGS. 2 and 3) of the other wireless electronic device 120. For example, the wearable wireless electronic device 100 may be wrapped partially or completely around a limb of the user 110, or otherwise attached to the user 110, and the other wireless electronic device 120 may contemporaneously be held by a hand of the user 110.

In some embodiments, the other wireless electronic device 120 may be a mobile telephone, a tablet computer, or any other wireless electronic device that is configured to communicate with the wearable wireless electronic device 100 through the body of the user 110. For example, the other wireless electronic device 120 may be a mobile telephone that is held by the user 110. As an example, the mobile telephone may be separated from the wearable wireless electronic device 100 by about 220.0 millimeters (mm) when the wearable wireless electronic device 100 is a wristband (or a watch) that the user 110 wears on a wrist that is adjacent a hand that is holding the mobile telephone, as illustrated in FIG. 1.

Figure 2:
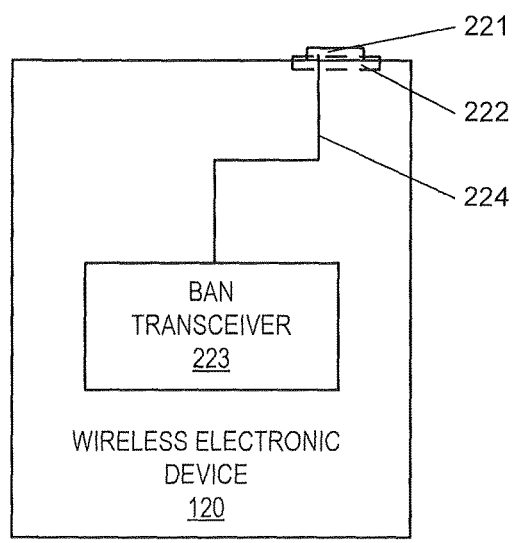
FIG. 2 illustrates a diagram of a conductive button and a Body Area Network (BAN) transceiver of a wireless electronic device, according to various embodiments of the present inventive concepts.

Referring now to FIG. 2, a diagram of the wireless electronic device 120 of FIG. 1 is provided, according to various embodiments of the present inventive concepts. In particular, FIG. 2 illustrates that the wireless electronic device 120 includes a conductive button 221 that is electrically connected to a BAN transceiver 223 by an electrical connection 224. The BAN transceiver 223 is configured to provide (e.g., transmit and receive) BAN communications with the BAN transceiver 130 of the wearable wireless electronic device 100 via the body of the user 110. Specifically, a BAN communications link may be provided between the wireless electronic device 120 and the wearable wireless electronic device 100 when the user 110 touches the conductive button 221 of the wireless electronic device 120. An insulating material 222 around the conductive button 221 can electrically isolate the conductive button 221 from adjacent portions of the frame/chassis (e.g., external sides/edges) of the wireless electronic device 120.

The conductive button 221 may be on any edge/surface of the wireless electronic device 120 that is touchable by the user 110. For example, the conductive button 221 of the wireless electronic device 120 may be anywhere on an external perimeter of the wireless electronic device 120. As an example, the conductive button 221 may be a power (e.g., on/off) button of the wireless electronic device 120. Additionally or alternatively, the conductive button 221 may be a button that performs non-power-button functions. As an example, the conductive button 221 may be a home-screen button that returns the user 110 to a home screen of the display 354 (described in detail herein with respect to FIG. 3) of the wireless electronic device 120. In some embodiments, the user 110 can press/move the conductive button 221, and/or the conductive button 221 may protrude beyond an adjacent surface of the frame of the wireless electronic device 120 that is touchable by the user 110. Alternatively, the conductive button 221 may be immovable and/or may have an outermost surface that is substantially coplanar with an adjacent surface of the frame that is touchable by the user 110.

Because the conductive button 221 is electrically conductive, the conductive button 221 may transmit BAN communications via the BAN link. The conductive button 221 may include any electrically-conductive material. For example, the conductive button 221 may include one or more metals and may be referred to as a metal button. In some embodiments, the conductive button 221 may include the same electrically-conductive material(s) as the frame of the wireless electronic device 120. As an example, the wireless electronic device 120 may have a metal frame that defines an outer perimeter thereof, and the conductive button 221 may use the same metal(s) as the metal frame. Alternatively, the wireless electronic device 120 may use an electrically-insulating frame, and the conductive button 221 may thus include one or more electrically-conductive materials that are absent from the frame of the wireless electronic device 120.

Referring still to FIG. 2, the insulating material 222 may provide (e.g., define/form) an insulating perimeter around the conductive button 221. For example, the insulating material 222 may provide a continuous loop around the conductive button 221. The insulating material 222 may have an external surface that is touchable by the user 110. Moreover, the insulating material 222 may extend partially or entirely along a depth/thickness of the frame of the wireless electronic device 120, thus electrically isolating the conductive button from the frame even when the user 110 moves/presses the conductive button 221 downward or laterally. The insulating material 222 may be directly adjacent the conductive button 221 such that it intervenes between the conductive button 221 and any other portion of the frame of the wireless electronic device 120. Moreover, the wireless electronic device 120 may optionally include a plurality of insulating portions that electrically isolate the conductive button 221.

Accordingly, part of the frame/perimeter of the wireless electronic device 120 may include the insulating material 222. Because the insulating material 222 may provide a free-floating area around the conductive button 221, the body (e.g., a finger) of the user 110 may absorb more of an electric field that is created between the conductive button 221 and a ground of the wireless electronic device 120. Specifically, the insulating material 222 helps to reduce the risk of forming an electrical connection between the conductive button 221 and any other conductive portion of the frame of the wireless electronic device 120.

Referring still to FIG. 2, the electrical connection 224 may be a wire or any other physical, conductive electrical connection that extends from the conductive button 221 to the BAN transceiver 223. Accordingly, when the user 110 touches the conductive button 221, a BAN communications link may be provided between the BAN transceiver 223 of the wireless electronic device 120 and the BAN transceiver 130 of the wearable wireless electronic device 100, via the electrical connection 224.

Figure 3:
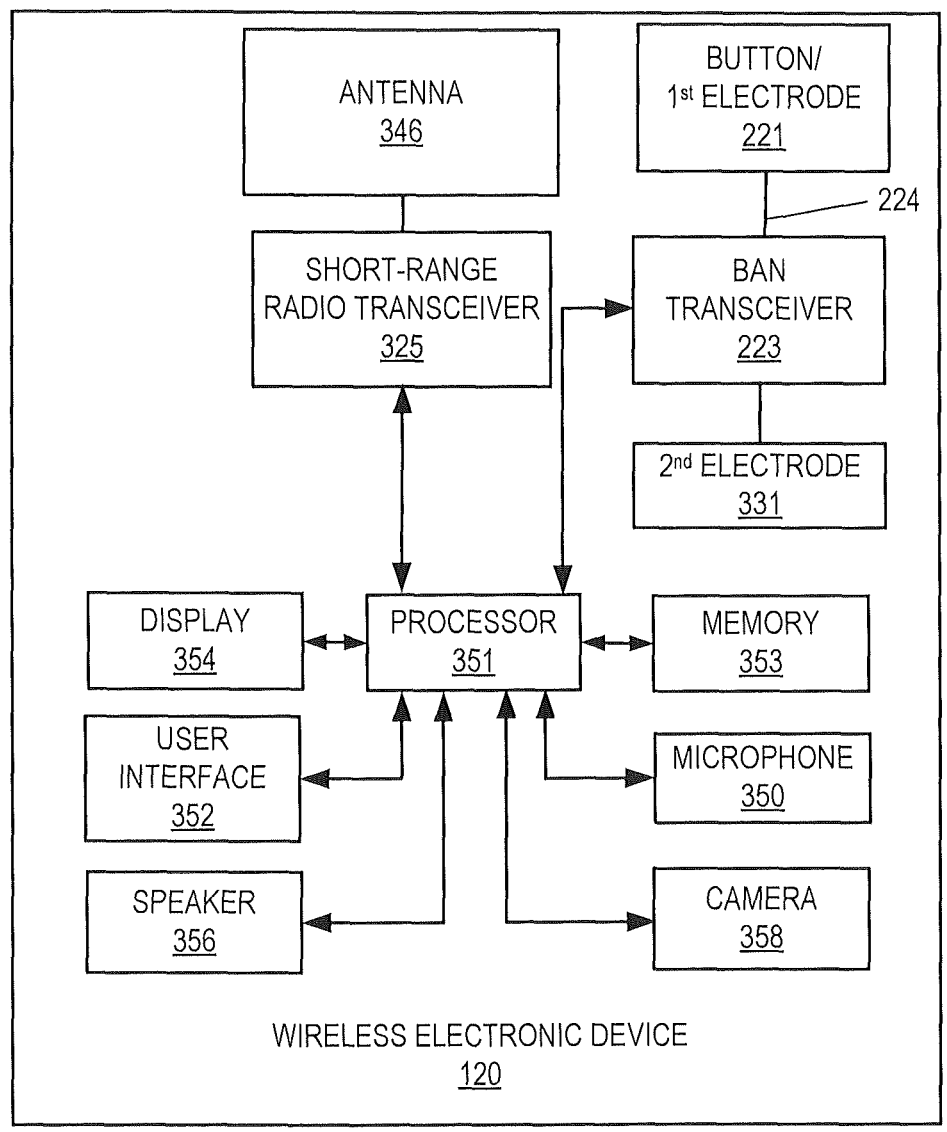
FIG. 3 illustrates a block diagram of the wireless electronic device of FIG. 2, according to various embodiments of the present inventive concepts.

Referring now to FIG. 3, a block diagram of the wireless electronic device 120 of FIG. 2 is provided, according to various embodiments of the present inventive concepts. As illustrated in FIG. 3, the wireless electronic device 120 may include a display 354, a user interface 352, a processor (e.g., processor circuit) 351, a memory 353, and a camera 358. Moreover, the wireless electronic device 120 may include an antenna 346, a short-range radio transceiver (e.g., a short-range radio transceiver circuit) 325, a speaker 356, and a microphone 350. Although short-range radio communications (e.g., Wi-Fi, Bluetooth, etc.) are discussed by way of example, other over-the-air wireless communications (e.g., cellular wireless communications) may be provided instead of, or in addition to, short-range radio communications.

A transmitter portion of the short-range radio transceiver 325 may convert information, which is to be transmitted by the wireless electronic device 120, into electromagnetic signals suitable for radio communications (e.g., to the wearable wireless electronic device 100 illustrated in FIG. 1). A receiver portion of the short-range radio transceiver 325 may demodulate electromagnetic signals, which are received by the wireless electronic device 120 from the wearable wireless electronic device 100, to provide information contained in the signals in a format understandable to the processor 351 and/or the user 110 of the wireless electronic device 120.

The wireless electronic device 120 is not limited to any particular combination/arrangement of the user interface 352 and the display 354. For example, the user interface 352 may be an input interface that accepts inputs (e.g., touch, click, motion, proximity, or keypad inputs) from the user 110. Moreover, the display 354 may be referred to as a user interface that provides graphical/visual outputs to the user 110. As an example, the functions of the user interface 352 and the display 354 may be provided by a touch screen through which the user 110 can view information, such as computer-displayable files, provide input thereto, and otherwise control the electronic device 100. In particular, regardless of whether the wireless electronic device 120 is a mobile/cellular telephone, a tablet computer, or another device, a touch screen may provide/integrate the user interface 352 and the display 354. Additionally or alternatively, the wireless electronic device 120 may include a separate user interface 352 and display 354. For example, user input may be accepted through a touchpad, a mouse, or another user input interface that is separate from the display 354.

Figure 7:
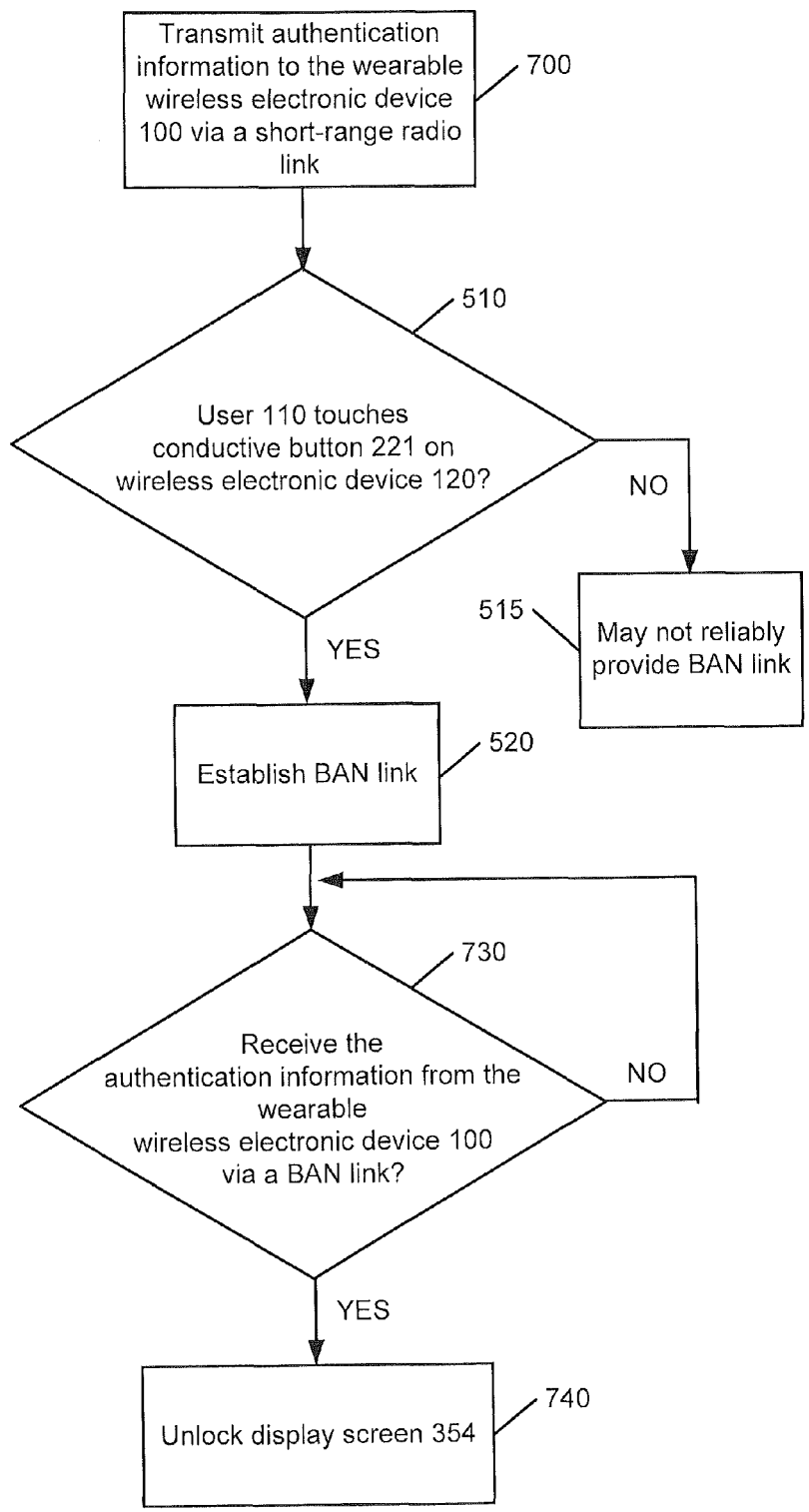
FIG. 7 illustrates a flowchart of operations of the wireless electronic device of FIG. 2, according to various embodiments of the present inventive concepts.

Referring still to FIG. 3, the memory 353 can store computer program instructions that, when executed by the processor circuit 351, carry out operations of the wireless electronic device 120 (e.g., as illustrated in the flowchart of FIG. 7). As an example, the memory 353 can be non-volatile memory, such as a flash memory, that retains the stored data while power is removed from the memory 353.

Additionally, in some embodiments, the wireless electronic device 120 may include two or more BAN electrodes that operate in combination with the BAN transceiver 223 to provide BAN communications with the wearable wireless electronic device 100 through the body of the user 110. The electrodes may be distinct (e.g., discrete) areas that are spaced apart from each other and that can provide active BAN communications in a particular focused direction. For example, a first one of the electrodes may be connected to the conductive button 221 or may be the conductive button 221 itself. A second electrode 331 may be on any ground plane of the wireless electronic device 120, or may be on a top portion (e.g., a top portion of a backplate) of the wireless electronic device 120 or on any portion of the frame/perimeter of the wireless electronic device 120. Moreover, the top surface of the second electrode 331 may have a surface area of about 5.0 square centimeters.

Although electric field propagation may be improved when the user 110 only touches one (rather than both) of the first and second electrodes 221, 331, a BAN link may still be established when the user 110 touches both of the first and second electrodes 221, 331. Moreover, although the user 110 may touch either of the first and second electrodes 221, 331, the first electrode/conductive button 221 may be a more intuitive location for the user 110 to touch because the user 110 is already familiar with touching the conductive button 221 to turn on the display 354. Additionally, although it may be possible to omit the second electrode 331 from the wireless electronic device 120 and still establish the BAN link, including both of the first and second electrodes 221, 331 in/on the wireless electronic device 120 may help to generate a higher voltage and thus a stronger electric field for the BAN link.

Figure 4:
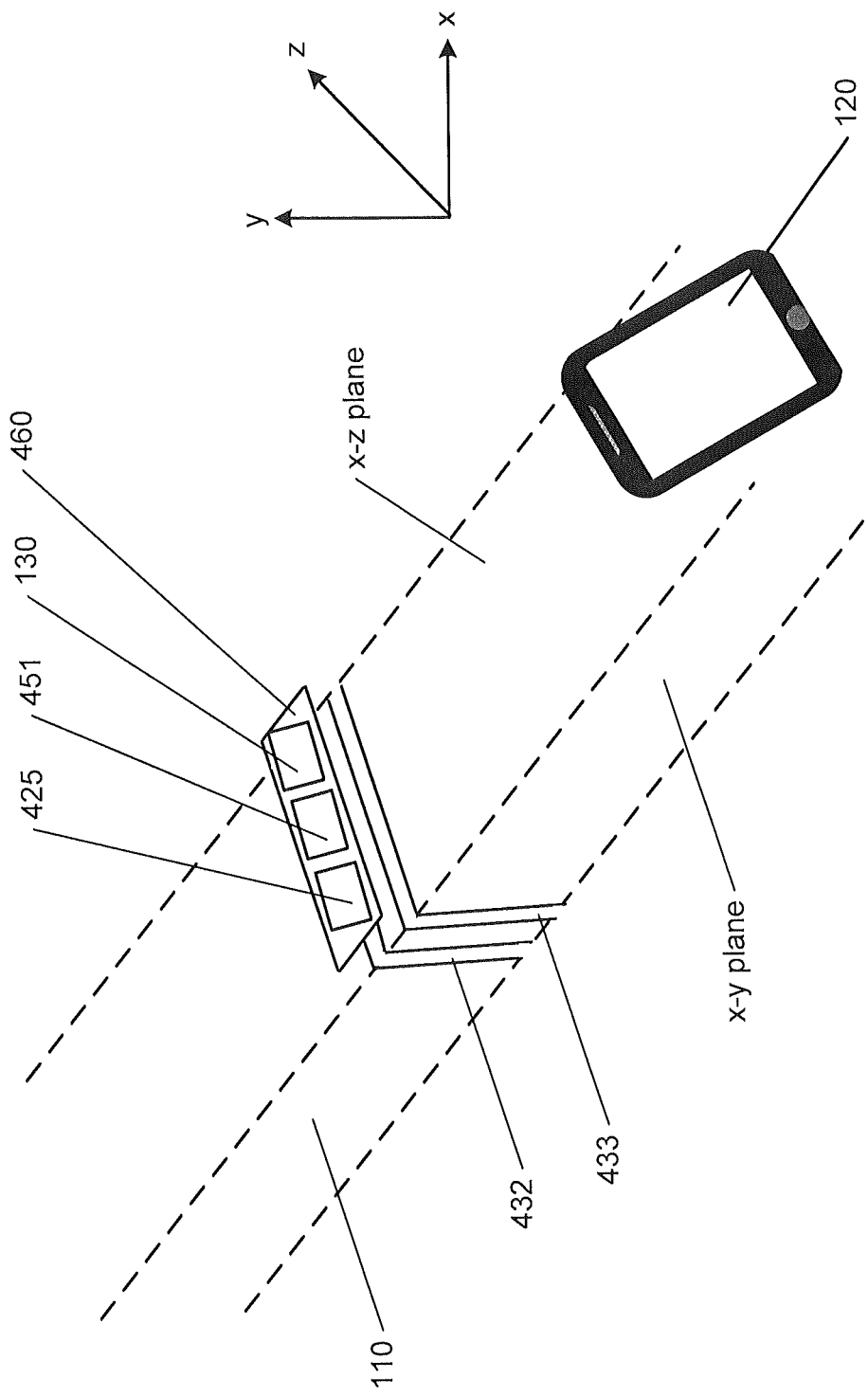
FIG. 4 illustrates a diagram of components of the wearable wireless electronic device of FIG. 1, according to various embodiments of the present inventive concepts.

Referring now to FIG. 4, a diagram of components of the wearable wireless electronic device 100 of FIG. 1 is provided, according to various embodiments of the present inventive concepts. In particular, FIG. 4 illustrates that the wearable wireless electronic device 100 may use spaced-apart first and second electrodes 432, 433 to communicate via a BAN link with the other wireless electronic device 120. Alternatively, the wearable wireless electronic device 100 may use a single electrode or three or more electrodes to communicate via the BAN link. The wearable wireless electronic device 100 in FIG. 4 is spaced apart from the other wireless electronic device 120 along an arm of the user 110. In particular, FIG. 4 illustrates a model of the arm of the user 110 in which the other wireless electronic device 120 is held in a hand of the user 110. Specifically, the arm of the user 110 is modeled as a cuboid that includes, for example, faces in the x-y and x-z planes.

In some embodiments, surfaces of the electrodes 432, 433 may be exposed to the body of the user 110. Alternatively, the wearable wireless electronic device 100 may include a material that covers the electrodes 432, 433. In particular, although using the electrodes 432, 433 in direct contact with the body of the user 110 may provide better performance than using a cover that will intervene between the electrodes 432, 433 and the body, such a cover may optionally be used. For example, a wrist band (or a watch) that includes the electrodes 432, 433 may provide rubber, silicone, or another material over the electrodes 432, 433. Accordingly, the electrodes 432, 433 of the wearable wireless electronic device 100 may be exposed to the body of the user 110 or may optionally be covered.

The BAN transceiver circuit 130 of the wearable wireless electronic device 100 may be on a Printed Circuit Board (PCB) 460 that may include a conductive material that may be referred to herein as a ground plane. The conductive material may overlap (e.g., may be vertically spaced apart from) the first and second electrodes 432, 433, or may be arranged between the first and second electrodes 432, 433. The first and second electrodes 432, 433 of the wearable wireless electronic device 100 may be configured to be electrically coupled to the conductive material of the PCB 460. For example, the first and second electrodes 432, 433 may be arranged/positioned such that when a voltage is applied to and/or by the conductive material of the PCB 460, the first and second electrodes 432, 433 provide an electric field that can be imposed on the body of the user 110. Moreover, the top surface of the PCB 460 may have a surface area of less than about 10.0 square millimeters.

Referring still to FIG. 4, a processor circuit 451 and/or other circuitry of the wearable wireless electronic device 100 may be used to apply the voltage to/by the conductive material of the PCB 460. The processor circuit 451 may be on the PCB 460, along with the BAN transceiver circuit 130 and a short-range transceiver circuit 425. The BAN transceiver circuit 130 and the short-range transceiver circuit 425 may be configured to provide functionality similar to that of the BAN transceiver circuit 223 and the short-range transceiver circuit 325, respectively, of the other wireless electronic device 120.

Portions of the first and second electrodes 432, 433 may be curved such that the first and second electrodes 432, 433 wrap partially or completely around a limb of the body of the user 110. For example, the first and second electrodes 432, 433 may each have one or more curves (e.g., rigid curves/bends or otherwise non-planar portions) regardless of whether the user 110 is wearing the wearable wireless electronic device 100. Additionally or alternatively, the first and second electrodes 432, 433 may include a flexible material such that the first and second electrodes 432, 433 contour to the shape of a limb of the body of the user 110. In other words, the first and second electrodes 432, 433 may be inherently curved at preexisting curved portions thereof and/or may be curved at flexible portions thereof when the wearable wireless electronic device 100 is worn by the user 110. Accordingly, by preexisting curved portions of the first and second electrodes 432, 433 and/or by flexible portions of the first and second electrodes 432, 433, the first and second electrodes 432, 433 may be configured to have curved portions thereof when the wearable wireless electronic device 100 is worn on a limb of the body of the user 110.

The first and second electrodes 432, 433 (as well as the first and second electrodes 221, 331 of the wireless electronic device 120) may be configured to transmit communications through the body of the user 110 by imposing an electric field on the body. The body of the user 110 provides the transmission medium along the length of a limb of the body for communications between the wearable wireless electronic device 100 and the other wireless electronic device 120. In particular, conductive fluid, tissues (e.g., blood vessels, internal tissue, skin, etc.) in/of the body of the user 110 may be used as a communications channel. Moreover, electrically shorting one of the first and second electrodes 432, 433 to the conductive material of the PCB 460 may help to impose an electric field onto the body of the user 110 rather than radiating into the air.

The transceiver circuit 130 of the wearable wireless electronic device 100 may be configured to electrically couple the conductive material of the PCB 460 to the first and second electrodes 432, 433 to communicate BAN signals. For example, a transmitter portion of the transceiver circuit 130, in operational cooperation with the processor circuit 451 of the wearable wireless electronic device 100, may convert information, which is to be transmitted by the wearable wireless electronic device 100, into electromagnetic signals suitable for communication to the other wireless electronic device 120. Moreover, a receiver portion of the transceiver circuit 130 (or of a separate transceiver circuit) may demodulate electromagnetic signals, which may be received (in some embodiments) by the wearable wireless electronic device 100 from the other wireless electronic device 120, to provide the information contained in the signals in a format understandable by the processor circuit 451 of the wearable wireless electronic device 100.

The communications that are provided by the transceiver 130 of the wearable wireless electronic device 100 may be BAN communications that are intended for/constrained to conductive pathways within the body of the user 110. Moreover, because BAN communications provide data through a human body, BAN communications may also be referred to as Body-Coupled Communications. In other words, in contrast with Bluetooth, Wi-Fi, cellular, Near-Field Communication (NFC), or Radio-Frequency Identification (RFID) transmissions, little or no data of BAN transmissions may transmit from the BAN transceiver 130 through the air (or radiate from the body of the user 110 to transmit through the air). Accordingly, using BAN transmissions through the body of the user 110 may increase the security (e.g., by protecting against interception by third-party devices) of transmitted information, in comparison with transmissions that are primarily or exclusively through the air.

Moreover, BAN transmissions, in comparison with transmissions that are primarily or exclusively through the air, may reduce power consumption by the wearable wireless electronic device 100 and the other wireless electronic device 120. Accordingly, BAN technology may be advantageous for intra-body communications via wearable devices such as the wearable wireless electronic device 100.

In particular, the transceiver 130 of the wearable wireless electronic device 100 may be configured to provide communications through the body of the user 110, using BAN technology. Specifically, the first and second electrodes 432, 433 of the transceiver 130 may be configured to transmit and/or receive non-Bluetooth, non-Wi-Fi, non-cellular, non-NFC, and/or non-RFID communications through the body of the user 110 wearing the wearable wireless electronic device 100 with the other wireless electronic device 120. As an example, the BAN communications described herein may to use carrier frequencies between about 10.0 Megahertz (MHz) and about 40.0 MHz to transmit communications through the body of the user 110. For example, BAN signals at about a 26.0 MHz carrier frequency may provide a well-controlled communication link in a channel provided by the body of the user 110, with minimal or no signal radiation from the body.

In some embodiments, the BAN transceiver circuits 223, 130 of the wireless electronic device 120 and the wearable wireless electronic device 100, respectively, may be similar to transceiver chips/circuits configured for wireless communications for computer keyboards or computer mice. The transceiver chips/circuits configured for wireless communications for computer keyboards or computer mice, however, use antennas that transmit communications through the air. Various embodiments of the present inventive concepts described herein, on the other hand, transmit BAN communications through the user 110's body rather than through the air. In particular, the BAN transceiver circuits 223, 130 each provide BAN communications using one or more electrodes (e.g., the electrodes 221, 331, 432, 433) instead of transmitting substantial communications through the air via antennas.

In some embodiments, data transmitted by the wearable wireless electronic device 100 using the BAN link may be fitness/health data for the user 110 that is determined/measured by the wearable wireless electronic device 100, but is not limited to such fitness health data. For example, the data may be any type of data that can be received by the other wireless electronic device 120 and subsequently stored and/or processed therein, forwarded to yet another wireless electronic device or a server/cloud, and/or presented to the user 110 via the display 354 and/or user interface 352 of the other wireless electronic device 120. Moreover, the wearable wireless electronic device 100 may include one or more among various types of sensors that can detect/provide information regarding the body of the user 110 and/or information regarding devices/environments external to the body of the user 110.

Figure 5:
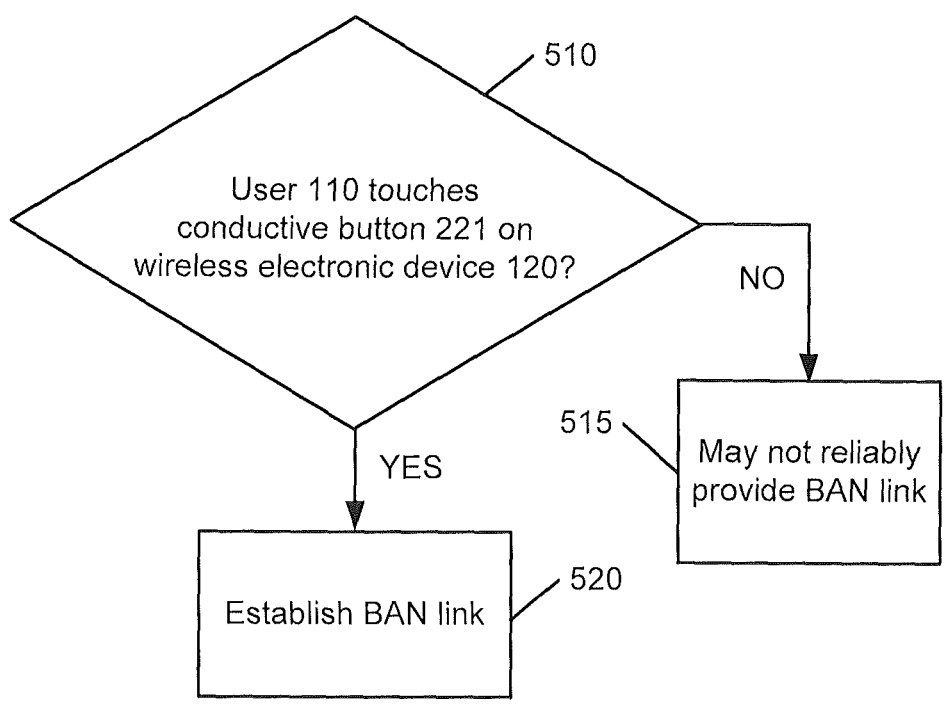
FIG. 5 illustrates a flowchart of operations of providing BAN communications between the wearable wireless electronic device and the other wireless electronic device, according to various embodiments of the present inventive concepts.

Referring now to FIG. 5, a flowchart of operations of providing BAN communications between the wearable wireless electronic device 100 and the other wireless electronic device 120 is provided, according to various embodiments of the present inventive concepts. In particular, FIG. 5 illustrates establishing (Block 520) a BAN communications link between the wearable wireless electronic device 100 and the other wireless electronic device 120, through the body of the user 110 wearing the wearable wireless electronic device 100, when the user 110 touches (Block 510) the conductive button 221 on the other wireless electronic device 120. Specifically, a hand of the user 110 may provide galvanic (or almost galvanic) contact with the conductive button 221. In other words, the contact of the hand with the conductive button 221 may provide an electric current between the hand and the conductive button 221, and BAN communications may be provided via the electric current.

If, however, the user 110 is not touching the conductive button 221 of the other wireless electronic device 120 when the wearable wireless electronic device 100 is worn by the user 110, then the wearable wireless electronic device 100 and the other wireless electronic device 120 may not be able to reliably provide a BAN link therebetween (Blocks 510 and 515). For example, because the strength of an electric field between a hand of the user 110 and the wireless electronic device 120 may rapidly decline once the hand is removed from a surface of the conductive button 221, BAN communications may be unreliable when the hand is removed from the conductive button 221.

Although touching the conductive button 221 may, in some embodiments, include pressing the conductive button 221 to activate a function of the conductive button 221 (e.g., to turn on the display 354 when pressing an on/off button), the BAN link may optionally be provided before and/or after the user 110 presses the conductive button 221, as long as the user 110 is still touching (e.g., as long as a hand of the user 110 is directly contacting) the conductive button 221. Moreover, establishing the BAN link may not necessarily require direct contact between the hand of the user 110 and the conductive button 221. For example, in some embodiments, the BAN link may still be established if the user 110 is wearing a glove or otherwise has a thin material intervening between the hand and the outer surface of the conductive button 221. Additionally or alternatively, in some embodiments, one or more outer surfaces of the frame of the wireless electronic device 120 adjacent the conductive button 221 may be active BAN transmission surfaces (e.g., may be electrically connected to the BAN transceiver 223). Even if only the conductive button 221 (and not adjacent surfaces of the frame) is electrically connected to the BAN transceiver 223, the outermost surface of the conductive button 221 and the hand of the user 110 may electrically connect with each other via an electric field that extends up to about 1.0 millimeter from the outermost surface of the conductive button 221.

Performance of the BAN communications may improve when the wearable wireless electronic device 100 and the other wireless electronic device 120 are on the same side of the body of the user 110. For example, performance may improve when the wearable wireless electronic device 100 is worn on the user 110's right wrist and the other wireless electronic device 120 is held in the user 110's right hand, as illustrated in FIG. 1. In some embodiments, however, BAN communications may be provided when the wearable wireless electronic device 100 and the other wireless electronic device 120 are on opposite (i.e., right and left, respectively, or vice versa) sides of the user 110's body. For example, although using different hands may result in a higher path loss, BAN communications may still be provided. Moreover, although FIG. 1 illustrates an example in which the wearable wireless electronic device 100 is worn on the user 110's arm, some embodiments may provide a wearable wireless electronic device 100 that can transmit BAN signals to the other wireless electronic device 120 when the wearable wireless electronic device 100 is worn on the user 110's leg or on the user 110's head (e.g., using a headband or headset).

Figure 6A:
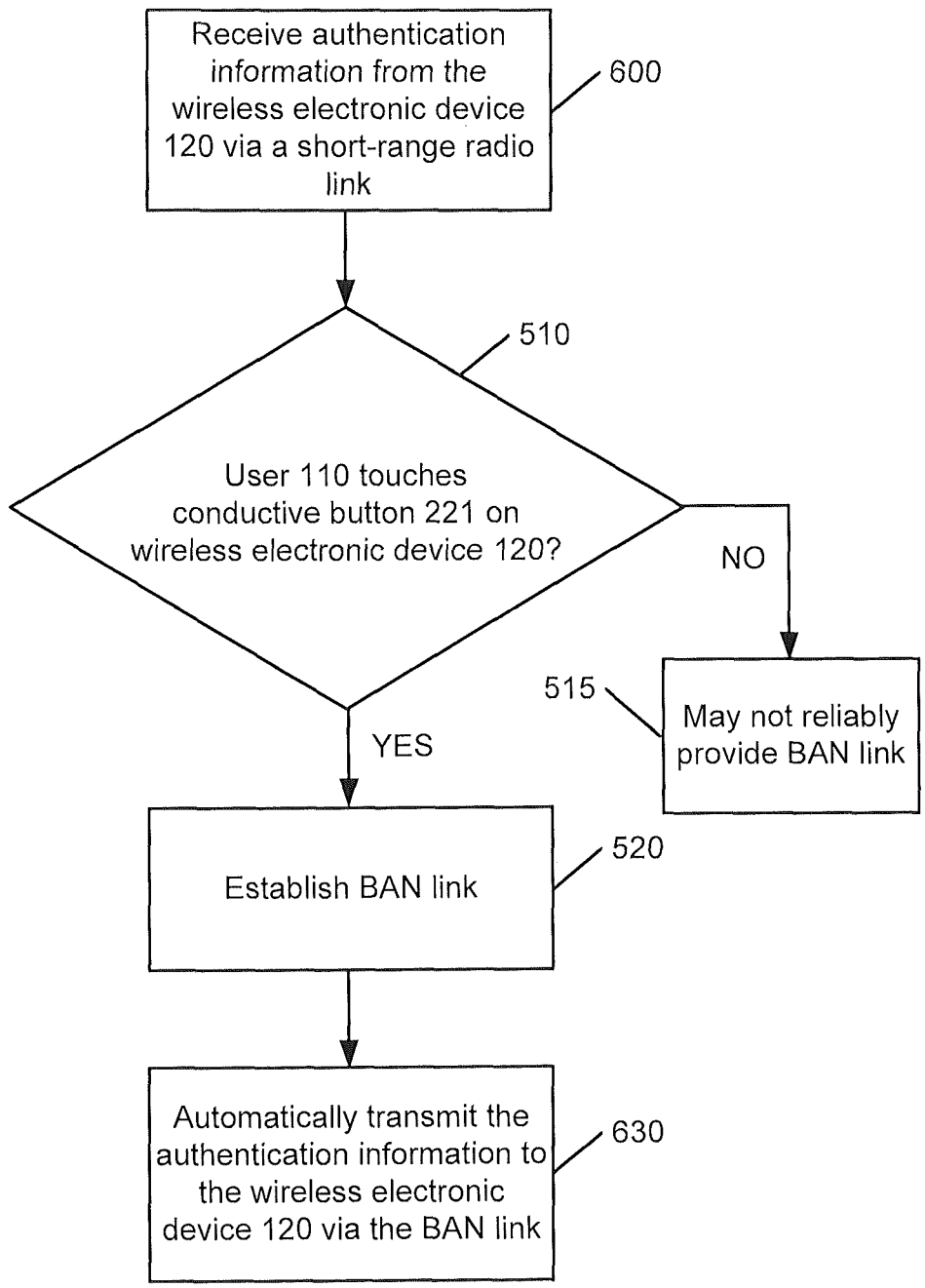
FIGS. 6A-6C illustrate flowcharts of operations of the wearable wireless electronic device of FIG. 1, according to various embodiments of the present inventive concepts.
Figure 6B:
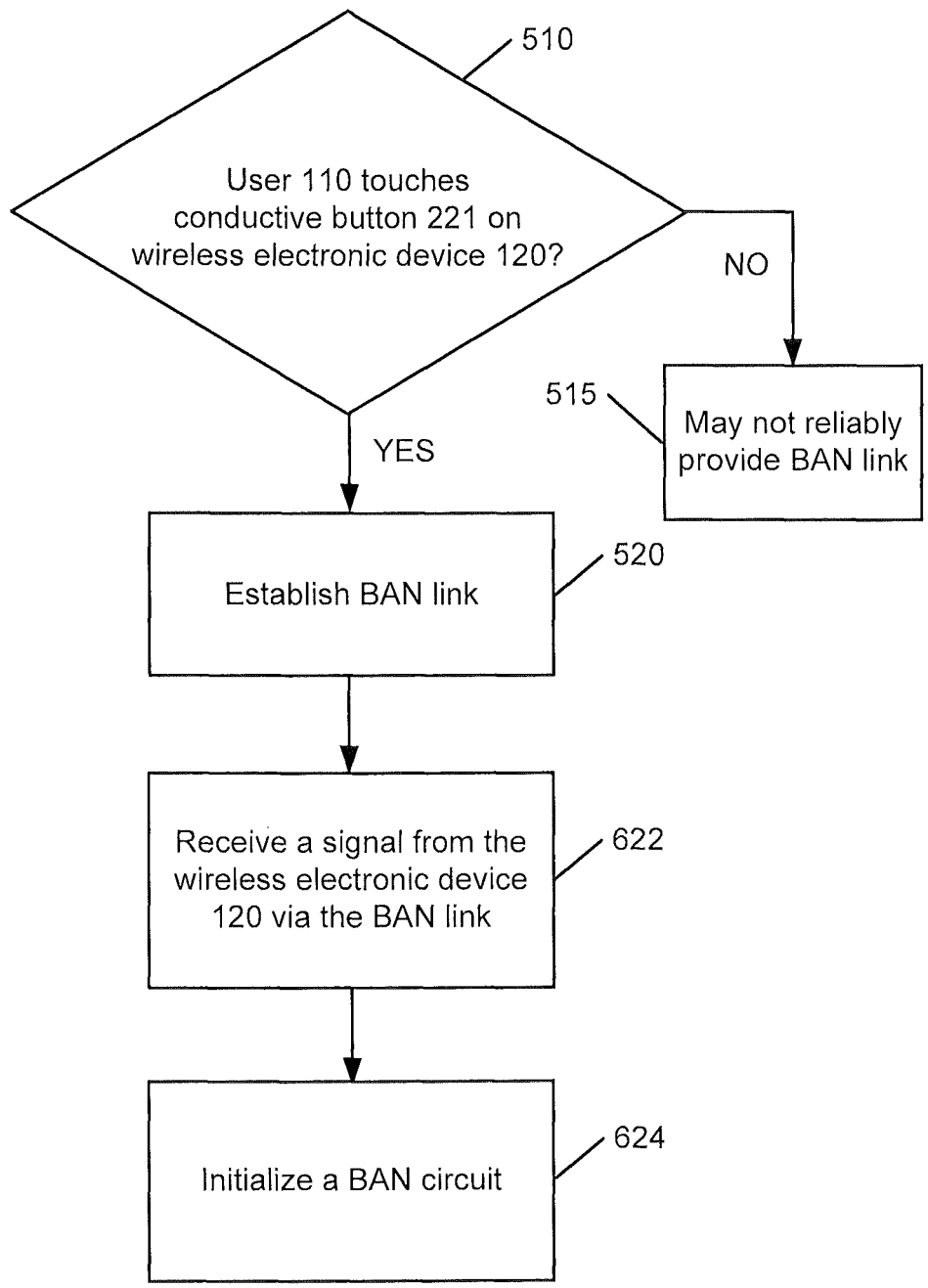
Figure 6C:
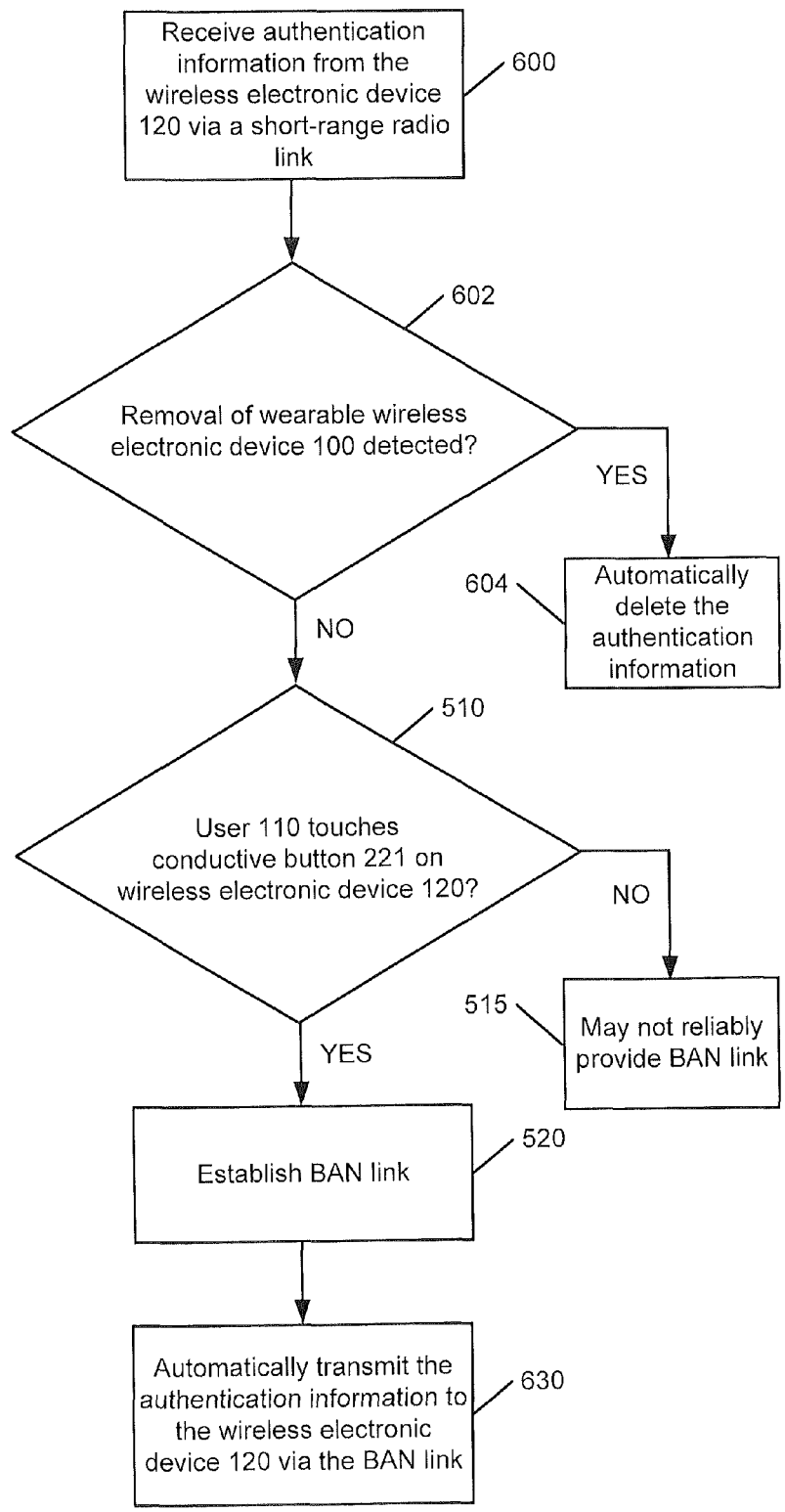

Referring now to FIGS. 6A-6C, flowcharts of operations of the wearable wireless electronic device 100 of FIG. 1 are provided, according to various embodiments of the present inventive concepts. In particular, referring to FIG. 6A, the operations may include receiving (Block 600) authentication information from the wireless electronic device 120 via a short-range radio communications link. For example, the wearable wireless electronic device 100 may receive an unlock code/key from the other wireless electronic device 120 to unlock the display 354 of the other wireless electronic device 120. As an example, after pressing (and/or otherwise touching or nearly touching) an on/off button of the other wireless electronic device 120, the display 354 may prompt the user 110 to enter an alphanumeric password to unlock (e.g., access) a home screen and various applications (e.g., email or other messaging applications) thereon of the other wireless electronic device 120. Rather requiring the user 110 to manually enter an alphanumeric password (e.g., the unlock code/key), various embodiments described herein allow the user 110 to automatically transmit the unlock code/key from the wearable wireless electronic device 100 to the other wireless electronic device 120, as described in detail herein with respect to Block 630.

Moreover, the short-range radio communications link indicated in Block 600 may refer to any short-range radio communications link through the air. Specifically, the wearable wireless electronic device 100 may include a short-range radio transceiver 425 that is configured to provide short-range radio communications via the short-range radio communications link. For example, the short-range radio transceiver 425 may be a Bluetooth transceiver or a Wi-Fi transceiver. Accordingly, operations in Block 600 may include receiving authentication information from the other wireless electronic device 120 via a Bluetooth link or a Wi-Fi link.

Referring to FIGS. 5 and 6A, the operations may include establishing (Block 520) a BAN link between the wearable wireless electronic device 100 and the other wireless electronic device 120 when the user 110 is touching the conductive button 221 of the other wireless electronic device 120. In particular, the BAN link may be established after the wearable wireless electronic device 100 receives the authentication information via the short-range radio communications link. For example, the wearable wireless electronic device 100 may receive new authentication information (e.g., a different code/key) on a regular basis (e.g., each morning, hour, minute, etc.) via the short-range radio communications link, and the BAN link may be established upon returning the new authentication information from the wearable wireless electronic device 100 back to the other wireless electronic device 120. Alternatively, the wearable wireless electronic device 100 may receive new authentication information on an irregular basis (e.g., based on one or more triggering events).

Referring still to FIG. 6A, the operations of the wearable wireless electronic device 100 may include automatically transmitting (Block 630) the authentication information to the other wireless electronic device 120 via the BAN link when the user is touching the conductive button 221 of the other wireless electronic device 120. Specifically, the BAN transceiver 130 of the wearable wireless electronic device 100 may be configured to automatically transmit the authentication information via the BAN link upon establishment of the BAN link. Accordingly, the wearable wireless electronic device 100 may receive (Block 600) the authentication information via the short-range radio link and may subsequently return/transmit (Block 630) the authentication information to the other wireless electronic device 120 via the BAN link.

Moreover, because the BAN link may be established (Block 520) within milliseconds of the user 110 beginning to touch the conductive button 221, the user 110 will likely still be touching the conductive button 221 for a sufficient amount of time to automatically transmit (Block 630) the authentication information from the wearable wireless electronic device 100 before the user 110 discontinues contact with the conductive button 221. In other words, the user's 110 natural, intuitive intentional touching (e.g., pressing) of the conductive button 221 occurs for a sufficient amount of time to complete the operations of both Blocks 520 and 630.

For example, the wearable wireless electronic device 100 may automatically transmit the authentication information within a few milliseconds of the user 110's initial touch of the conductive button 221. The user 110's initial touch of the conductive button 221 may thus trigger (i) waking up (e.g., powering up) the display 354, (ii) establishing the BAN link, and (iii) transmitting the authentication information from the wearable wireless electronic device 100 to the other wireless electronic device 120 via the BAN link.

Referring now to FIG. 6B, operations of the wearable wireless electronic device 100 may include receiving (Block 622) a signal from the other wireless electronic device 120 via the BAN link. For example, the wearable wireless electronic device 100 may receive via the BAN link a signal from the other wireless electronic device 120 including a command to provide BAN communications. In response to receiving the signal, the wearable wireless electronic device 100 may initialize (Block 624) a BAN circuit.

As an example, a BAN transmitter of the wearable wireless electronic device 100 may be in a sleep mode and may be initialized (e.g., woken from the sleep mode) in response to receiving the signal from the other wireless electronic device 120. In particular, the processor 451 may initialize the BAN transmitter. In some embodiments, the BAN transmitter may be a transmitter portion of the BAN transceiver 130. Alternatively, the BAN transmitter may be a separate chip from the BAN transceiver 130. As another example, a receiver portion of the BAN transceiver 130 may be in a sleep mode and may be initialized in response to receiving the signal from the other wireless electronic device 120 and then used to read/demodulate data received via the BAN link. In some embodiments, the BAN transceiver 130 may be in a receiver polling mode that consumes about 2.5 microamperes of current and may be initialized (e.g., may enter a non-polling transceiver mode that uses significantly more than 2.5 microamperes of current) in response to receiving the signal from the other wireless electronic device 120. The receiver polling mode may thus reduce current consumption in comparison with other receive/transmit modes, before the wearable wireless electronic device 100 initializes the BAN transceiver 130 and then (i) transmits authentication information (and/or other information) from the BAN transceiver 130 to the wireless electronic device 120 and/or (ii) initializes the short-range radio transceiver 425. Accordingly, the wireless electronic device 120 and/or the wearable wireless electronic device 100 may use sleep modes for transceiver circuits, displays, and/or other components to help reduce current (and thus battery) consumption. For example, after initializing the BAN circuit (out of a sleep mode) in Block 624 of FIG. 6B, the wearable wireless electronic device 100 may then initialize the short-range radio transceiver 425 (out of a sleep mode) and may provide short-range radio communications between the wearable wireless electronic device 100 and the other wireless electronic device 120.

Alternatively, the wireless electronic device 120 may be a speaker that can play music that is streamed via a short-range radio communications link with a third wireless electronic device (e.g., a mobile phone or a tablet), and the wearable wireless electronic device 100 may initialize the BAN circuit in Block 624 of FIG. 6B with the speaker to trigger initializing of the short-range radio communications link between the speaker and the third wireless electronic device. In some embodiments, rather than a speaker, the wireless electronic device 120 may be a television, electronic glasses, or any other media streaming device that can play/stream audio and/or video received via a short-range radio communications link.

Referring now to FIG. 6C, operations of the wearable wireless electronic device 100 may include automatically deleting (Block 604) authentication information that is received (Block 600) from the other wireless electronic device 120, in response to detecting (Block 602) removal of the wearable wireless electronic device 100 from the body of the user 110. Accordingly, the wearable wireless electronic device 100 may provide enhanced security by using a sensor to detect removal of the wearable wireless electronic device 100 from the body of the user 110 and to immediately delete the authentication information in response to detecting the removal. For example, upon detecting that it has been removed from the body of the user 110, the wearable wireless electronic device 100 (e.g., using the processor 451) may automatically delete from a memory of the wearable wireless electronic device 100 a code/key that was received via a Bluetooth link with the other wireless electronic device 120, thus reducing the likelihood that an unauthorized user could use the wearable wireless electronic device 100 to unlock the display 354 of the other wireless electronic device 120.

Referring now to FIG. 7, a flowchart of operations of the wireless electronic device 120 of FIG. 2 is provided, according to various embodiments of the present inventive concepts. In particular, the operations may include transmitting (Block 700) authentication information from the wireless electronic device 120 to the wearable wireless electronic device 100 via a short-range radio communications link. If the wireless electronic device 120 subsequently receives (Block 730) the authentication information from the wearable wireless electronic device 100 via a BAN link, then the wireless electronic device 120 (using the processor 351) may use the authentication information to unlock (Block 740) the display 354 of the wireless electronic device 120. Additionally, if the display 354 was powered-off before the user 110 touched the conductive button 221, then operations in Block 740 may further include waking-up (e.g., powering-on) the display 354 before, after, or contemporaneously with unlocking the display 354.

Moreover, in some embodiments, the wireless electronic device 120 may further increase security by having additional requirements with respect to the authentication information that it receives from the wearable wireless electronic device 100. For example, the wireless electronic device 120 may only unlock the display 354 if the authentication information received from the wearable wireless electronic device 100 is the most recent authentication information that the wireless electronic device 120 transmitted to the wearable wireless electronic device 100. As an example, if the wireless electronic device 120 has transmitted two codes/keys to the wearable wireless electronic device 100 within a given time period, the wireless electronic device 120 may require receipt of the most recent one of the two codes/keys to unlock the display 354. Transmitting only the older one of the two codes/keys would not suffice. Alternatively, in some embodiments, the wireless electronic device 120 may require receipt of two or more codes/keys to unlock the display 354. Such a requirement may help to ensure that the wearable wireless electronic device 100 has remained in close range with the other wireless electronic device 120 during a given time period (e.g., overnight, over at least a few minutes, or over at least a few hours, etc.).

Various embodiments described herein provide BAN communications through the body of the user 110 when the user 110 is touching the conductive button 221 of the wireless electronic device 120. For example, as an alternative to unlocking the display 354 of the wireless electronic device 120 by requiring the user 110 to use a biometric sensor of the wireless electronic device 110 or by requiring the user 110 to manually enter an alphanumeric code/key (e.g., via the user interface 352), various embodiments herein automatically communicate the code/key from the wearable wireless electronic device 100 to the other wireless electronic device 120. This automatic communication, as described herein, may be defined as communicating the code/key (or other authentication information) without requiring any user input by the user 110 other than touching the conductive button 221 of the wireless electronic device 120. Unlocking the display 354 in response to the user 110's touch of the conductive button 221 may improve the user-friendliness (e.g., the intuitiveness) of the wireless electronic device 120 for the user 110 because the user 110 is already used to touching the conductive button 221 to turn on the display 354 of the wireless electronic device 120.

As an example, the wearable wireless electronic device 100 may be a wristband that includes the BAN transceiver 130 and a Bluetooth transceiver (e.g., the short-range radio transceiver 425. Specifically, the wristband may be a smartband that is made of silicone, rubber, and/or another flexible material, and that includes one or more small electronic devices integrated therein to provide BAN communications and non-BAN communications. When the user 110 touches a power button (e.g., the conductive button 221) on the wireless electronic device 120, a BAN communication may be initiated to awake the wearable wireless electronic device 100 and/or the other wireless electronic device 120. In some embodiments, the BAN communication may be used exclusively to wake up the wearable wireless electronic device 100 and/or the other wireless electronic device 120. For example, after using the BAN communication for the wake-up(s), subsequent communications between the wearable wireless electronic device 100 and the other wireless electronic device 120 (or between the other wireless electronic device 120 and a third wireless electronic device) may be provided using Bluetooth communications. Alternatively, additional BAN communications may be provided between the wearable wireless electronic device 100 and the other wireless electronic device 120 after the wake-up(s).

Although BAN communications are described herein using examples of communicating authentication information via a BAN link, the inventive entity appreciates that applications for BAN communications are not limited thereto. For example, an external speaker (or any other media streaming device) may include a touch area (e.g., an area including one or more electrodes) that the user 110 wearing the wearable wireless electronic device 100 may touch to establish a BAN link between the wearable wireless electronic device 100 and the speaker. The wearable wireless electronic device 100 and the speaker may then use the BAN link to initiate a Bluetooth link between the speaker and another wireless electronic device for streaming music from the other wireless electronic device to the speaker. In another example, BAN communications can be used to initiate photo or video streaming using electronic glasses or a television. Accordingly, in some embodiments, the user 110 may establish a BAN link with a speaker (or electronic glasses, or television, etc.), and may use the BAN link to initialize a subsequent short-range radio communications link between the speaker (or electronic glasses, or television, etc.) and another wireless electronic device.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A method of providing communications between a wearable first wireless electronic device and a second wireless electronic device, the method comprising:
    establishing a Body Area Network (BAN) link, through a human body of a user that is wearing the wearable first wireless electronic device, between the wearable first wireless electronic device and the second wireless electronic device, in response to the user touching a conductive button on the second wireless electronic device;
    automatically transmitting authentication information that unlocks a display screen of the second wireless electronic device, via the BAN link, from the wearable first wireless electronic device to the second wireless electronic device, in response to the user touching the conductive button on the second wireless electronic device; and
    receiving, at the wearable first wireless electronic device, the authentication information from the second wireless electronic device via a short-range over-the-air radio link, before establishing the BAN link.

2. The method of claim 1, wherein receiving the authentication information from the second wireless electronic device via the short-range radio link comprises:
    receiving the authentication information from the second wireless electronic device via a Bluetooth link between the wearable first wireless electronic device and the second wireless electronic device before establishing the BAN link.

3. The method of claim 1, further comprising:
    receiving, at the wearable first wireless electronic device, a signal from the second wireless electronic device via the BAN link; and
    initializing a BAN circuit of the wearable first wireless electronic device in response to receiving the signal via the BAN link.

4. The method of claim 1, further comprising:
    detecting removal of the wearable first wireless electronic device from the human body of the user; and
    automatically deleting the authentication information from the wearable first wireless electronic device in response to detecting the removal of the wearable first wireless electronic device from the human body of the user.

5. The method of claim 1, wherein automatically transmitting the authentication information comprises:
    automatically transmitting the authentication information via the BAN link through a transmission medium provided by the human body of the user wearing the wearable first wireless electronic device to the second wireless electronic device, using a frequency between about 10.0 Megahertz (MHz) and about 40.0 MHz,
    wherein the second wireless electronic device comprises a mobile telephone,
    wherein the wearable first wireless electronic device is worn on an arm of the user,
    wherein the mobile telephone is held by a hand of the user, and
    wherein automatically transmitting the authentication information comprises automatically transmitting the authentication information through the arm on which the wearable first wireless electronic device is worn by the user to the mobile telephone that is held by the hand of the user.

6. The method of claim 1,
    wherein the conductive button comprises a button of the second wireless electronic device that turns on the display screen, and
    wherein automatically transmitting comprises automatically transmitting the authentication information via the BAN link to the button of the second wireless electronic device that turns on the display screen, in response to the user touching the button of the second wireless electronic device that turns on the display screen.

7. The method of claim 1,
    wherein the wearable first wireless electronic device comprises a smart watch or smart wristband,
    wherein receiving the authentication information from the second wireless electronic device via the short-range radio link comprises:
        receiving, at the smart watch or smart wristband, the authentication information from the second wireless electronic device via the short-range over-the-air radio link, before establishing the BAN link.

8. A wearable first wireless electronic device, comprising:
    a Body Area Network (BAN) transceiver circuit configured to provide communications with a mobile second wireless electronic device via a BAN link through a human body of a user that is wearing the wearable first wireless electronic device, in response to the user touching a conductive button on the mobile second wireless electronic device; and
    a short-range radio transceiver circuit that is configured to receive authentication information from the mobile second wireless electronic device through a short-range over-the-air link before the wearable first wireless electronic device establishes the BAN link with the mobile second wireless electronic device.

9. The wearable first wireless electronic device of claim 8, wherein the BAN transceiver circuit is configured to automatically transmit the authentication information, via the BAN link, from the wearable first wireless electronic device to the mobile second wireless electronic device to unlock a display screen of the mobile second wireless electronic device, in response to the user touching the conductive button on the mobile second wireless electronic device.

10. The wearable first wireless electronic device of claim 9,
    wherein the conductive button comprises a button of the mobile second wireless electronic device that is configured to turn on the display screen, and
    wherein the BAN transceiver circuit of the wearable first wireless electronic device is configured to provide communications with the mobile second wireless electronic device via the BAN link through the button of the mobile second wireless electronic device that is configured to turn on the display screen, in response to the user touching the button of the mobile second wireless electronic device that is configured to turn on the display screen.

11. The wearable first wireless electronic device of claim 8, wherein the short-range radio transceiver circuit comprises a Bluetooth transceiver circuit configured to receive the authentication information from the mobile second wireless electronic device via a Bluetooth link between the wearable first wireless electronic device and the mobile second wireless electronic device before the wearable first wireless electronic device establishes the BAN link.

12. The wearable first wireless electronic device of claim 8,
wherein the BAN transceiver circuit is configured to receive a signal from the mobile second wireless electronic device via the BAN link,
wherein the wearable first wireless electronic device further comprises a processor, and
wherein the processor is configured to wake the BAN transceiver circuit from a sleep mode in response to receiving the signal via the BAN link.

13. The wearable first wireless electronic device of claim 8, further comprising:
a processor;
a memory; and
a sensor configured to detect removal of the wearable first wireless electronic device from the human body of the user,
wherein the processor is configured to automatically delete the authentication information from the memory in response to detection by the sensor of the removal of the wearable first wireless electronic device from the human body of the user.

14. The wearable first wireless electronic device of claim 8, further comprising first and second electrodes that are spaced apart from each other,
wherein the BAN transceiver circuit is configured to provide the communications via the BAN link through the first and second electrodes, and
wherein the first and second electrodes are configured to provide the communications through the human body of the user by imposing an electric field on the human body of the user.

15. The wearable first wireless electronic device of claim 8,
wherein the BAN transceiver circuit comprises a BAN transmitter,
wherein the wearable first wireless electronic device further comprises a processor, and
wherein the processor is configured to wake the BAN transmitter from a sleep mode in response to a signal from the mobile second wireless electronic device.

16. A first wireless electronic device, comprising:
a Body Area Network (BAN) transceiver circuit configured to provide BAN communications with a wearable second wireless electronic device via a BAN link through a human body of a user that is wearing the wearable second wireless electronic device and through a conductive button that is configured to control a device function of the first wireless electronic device, in response to the user touching the conductive button on the first wireless electronic device;
a display screen; and
a processor that is configured to unlock the display screen of the first wireless electronic device using authentication information,
wherein the conductive button is configured to turn on the display screen, and
wherein the BAN transceiver circuit is configured to receive the authentication information from the wearable second wireless electronic device, via the BAN link, through the conductive button on the first wireless electronic device that is configured to turn on the display screen in response to the user touching the conductive button on the first wireless electronic device that is configured to turn on the display screen.

17. The device of claim 16, further comprising:
a Bluetooth transceiver configured to transmit the authentication information to the wearable second wireless electronic device via a Bluetooth link before the first wireless electronic device establishes the BAN link.

18. The device of claim 16, further comprising first and second electrodes that are spaced apart from each other,
wherein the conductive button on the first wireless electronic device comprises one of the first and second electrodes,
wherein the BAN transceiver circuit is configured to provide the BAN communications via the BAN link through the first and second electrodes, and
wherein the first and second electrodes are configured to provide the BAN communications through the human body of the user by imposing an electric field on the human body of the user.

19. The device of claim 16, further comprising:
a metal frame that defines an outer perimeter of the first wireless electronic device;
an insulating material that defines an insulating perimeter around the conductive button that is configured to turn on the display screen, wherein the insulating perimeter is in the metal frame and intervenes between the metal frame and the conductive button that is configured to turn on the display screen; and
an electrical connection between the BAN transceiver circuit and the conductive button that is configured to turn on the display screen.

20. The device of claim 16, wherein:
the conductive button comprises a conductive power button;
the first wireless electronic device comprises a mobile telephone comprising the conductive power button; and
the BAN transceiver circuit is configured to transmit a BAN communications signal to the wearable second wireless electronic device via the BAN link through the conductive power button of the mobile telephone.

* * * * *